United States Patent
Park et al.

(10) Patent No.: US 8,610,468 B2
(45) Date of Patent: Dec. 17, 2013

(54) POWER INTERFACE CIRCUIT OF CONTACT IC CARD READER

(75) Inventors: Hyun Soo Park, Seoul (KR); Byeong Cheon Jeong, Suwon-si (KR); Kyung Hoon Kim, Seoul (KR); Yeon Seok Song, Seongnam-si (KR); Min Gyu Maing, Seoul (KR); Hong Chul Lee, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 160 days.

(21) Appl. No.: 13/142,079

(22) PCT Filed: Dec. 11, 2009

(86) PCT No.: PCT/KR2009/007451
§ 371 (c)(1),
(2), (4) Date: Jun. 24, 2011

(87) PCT Pub. No.: WO2010/074443
PCT Pub. Date: Jul. 1, 2010

(65) Prior Publication Data
US 2011/0254620 A1    Oct. 20, 2011

(30) Foreign Application Priority Data
Dec. 24, 2008  (KR) .................. 10-2008-0133449

(51) Int. Cl.
*H03B 1/00* (2006.01)
*H03K 3/00* (2006.01)

(52) U.S. Cl.
USPC .......................................... 327/108; 327/112

(58) Field of Classification Search
USPC ................................................. 327/108, 112
See application file for complete search history.

(56) References Cited

U.S. PATENT DOCUMENTS 6,885,225 B2 *  4/2005  Ohmichi et al. .............. 327/112

FOREIGN PATENT DOCUMENTS

| JP | 5-250532 A | 9/1993 |
|----|------------|--------|
| JP | 2002-269519 A | 9/2002 |
| JP | 2006-11917 A | 1/2006 |
| KR | 10-2007-0045963 A | 5/2007 |

OTHER PUBLICATIONS

International Search Report for PCT/KR2009/007451 issued Jul. 29, 2010 [PCT/ISA/210].

* cited by examiner

*Primary Examiner* — Lincoln Donovan
*Assistant Examiner* — Diana J Cheng
(74) *Attorney, Agent, or Firm* — Sughrue Mion, PLLC

(57) ABSTRACT

A power interface circuit of a contact integrated circuit (IC) card reader is provided. The power interface circuit includes a power control unit configured to invert, amplify and output a power control signal supplied from the outside, a switching diode unit configured to control on and off operations of a ground terminal transistor in a complementary transistor unit in response to an output signal of the power control unit, the complementary transistor unit in which complementary transistors transfer a power supply terminal voltage to a power output unit or mute a card power supply terminal of the power output unit to a ground voltage level while operating inversely to each other in response to a control signal directly input from the power control unit and a control signal input through the switching diode unit, and the power output unit configured to output a voltage input through the complementary transistor unit to a card power supply terminal of an IC card or maintain the card power supply terminal at the ground voltage level in response to operation of the complementary transistor unit.

9 Claims, 2 Drawing Sheets

POWER INTERFACE CIRCUIT OF CONTACT IC CARD READER

TECHNICAL FIELD

The present invention relates to design technology of a power interface circuit employed in various card readers, and more particularly, to a power interface circuit of a contact integrated circuit (IC) card reader that supplies stable power to a contact IC card using a simple configuration.

BACKGROUND ART

IC cards are classified into contact IC cards and contactless IC cards. While a contact IC card is physically connected with a card reader through its 8-pin terminal and communicates with the card reader, a contactless IC card communicates with the card reader using a radio frequency (RF) signal within a predetermined range.

The contact IC cards are employed in IC card terminals, various mobile devices, game machines, etc. embedded with subscriber identity modules (USIMs or SIMs), or security identity modules (SIMs). The contact IC cards do not include batteries, and are activated by power supplied from a power interface circuit only when connected to a card reader. When the connection is released, the supplied power is cut off, and the contact IC cards are kept inactivated.

To this end, a contact IC card reader has a card power interface circuit that supplies a voltage of a predetermined level when the contact IC card reader is connected with a contact IC card, and cuts off power supply when the connection is released.

A power interface circuit of a conventional contact IC card reader is implemented by a one-chip interface device, which cannot stably maintain the voltage of a power output terminal at a zero level even when separated from a contact IC card. Sometimes, the voltage of a power output terminal is maintained at a predetermined level (about 1 V) or above and affects the contact IC card.

Also, the power interface circuit of the conventional contact IC card reader occupies a large space due to a characteristic of the circuit configuration, and thus it is difficult to reduce the size and production cost.

DISCLOSURE

Technical Problem

The present invention is directed to simply and inexpensively implementing a power interface circuit that is employed in an integrated circuit (IC) card reader to supply power to a contact IC card, and stably maintaining the voltage of a power output terminal at a zero level when the power interface circuit is separated from the contact IC card.

Technical Solution

According to an aspect of the present invention, there is provided a power interface circuit of a contact IC card reader, including: a power input unit configured to transfer the power supply terminal voltage front outside to switching diode unit and complementary transistor; a power control unit configured to invert, amplify and output a power control signal supplied from the outside; a switching diode unit configured to control on and off operations of a ground terminal transistor in a complementary transistor unit in response to an output signal of the power control unit; the complementary transistor unit in which complementary transistors transfer a power supply terminal voltage to a power output unit or mute a card power supply terminal of the power output unit to a ground voltage level while operating inversely to each other in response to a control signal directly input from the power control unit and a control signal input through the switching diode unit; and the power output unit configured to output a voltage input through the complementary transistor unit to a card power supply terminal of an IC card or maintain the card power supply terminal at the ground voltage level in response to operation of the complementary transistor unit.

Advantageous Effects

An exemplary embodiment of the present invention simply implements a power interface circuit that can be employed in IC readers, subscriber identity modules (USIMs or SIMs), security identity modules (SIMs), etc., thereby reducing the size and production cost of the product.

Also, an exemplary embodiment of the present invention allows a power interface circuit to surely and stably maintain the voltage of a power output terminal at a zero level, thereby improving reliability of the product.

---

\* Description of Major Symbols in the above Figures

| | |
|---|---|
| 1: Power Control Unit | 2: Power Input Unit |
| 3: Switching Diode Unit | 4: Complementary Transistor Unit |
| 5: Power Output Unit | |

---

MODE FOR INVENTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
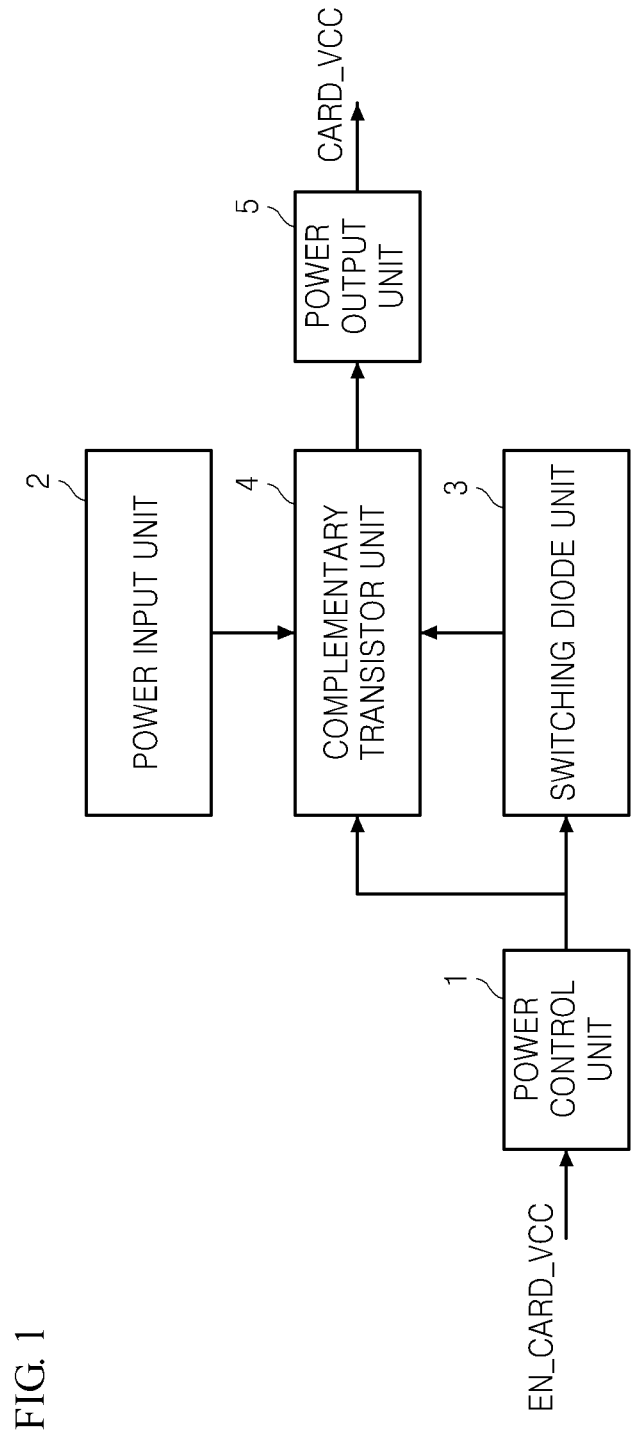
FIG. 1 is a block diagram of a power interface circuit of a contact integrated circuit (IC) card reader according to an exemplary embodiment of the present invention.

FIG. 1 is a block diagram of a power interface circuit of a contact integrated circuit (IC) card reader according to an exemplary embodiment of the present invention. As shown in the drawing, the power interface circuit includes a power control unit 1, a power input unit 2, a switching diode unit 3, a complementary transistor unit 4, and a power output unit 5.

The power input unit 2 is supplied with a power supply terminal voltage of a predetermined level from the outside and transfers the power supply terminal voltage to the switching diode unit 3 and the complementary transistor unit 4.

The power control unit 1 inverts a power control signal EN_CARD_VCC supplied from the outside, buffers and amplifies the inverted signal to a predetermined level, and outputs the amplified signal to the switching diode unit 3 and the complementary transistor unit 4.

The switching diode unit 3 controls on and off operations of a ground terminal transistor in the complementary transistor unit 4 in response to the output signal of the power control unit 1.

In the complementary transistor unit 4, complementary transistors transfer the power supply terminal voltage input through the power input unit 2 to the power output unit 5 or mute a card power supply terminal CARD_VCC of the power output unit 5 to a ground voltage level while operating inversely to each other in response to the control signal directly input from the power control unit 1 and a control signal input through the switching diode unit 3.

According to operation of the complementary transistor unit 4, the power output unit 5 outputs the voltage input through the complementary transistor unit 4 to the card power supply terminal CARD_VCC of an IC card in a mode for outputting voltage, and maintains the card power supply terminal CARD_VCC at the ground voltage level in a mode for outputting no voltage.

Figure 2:
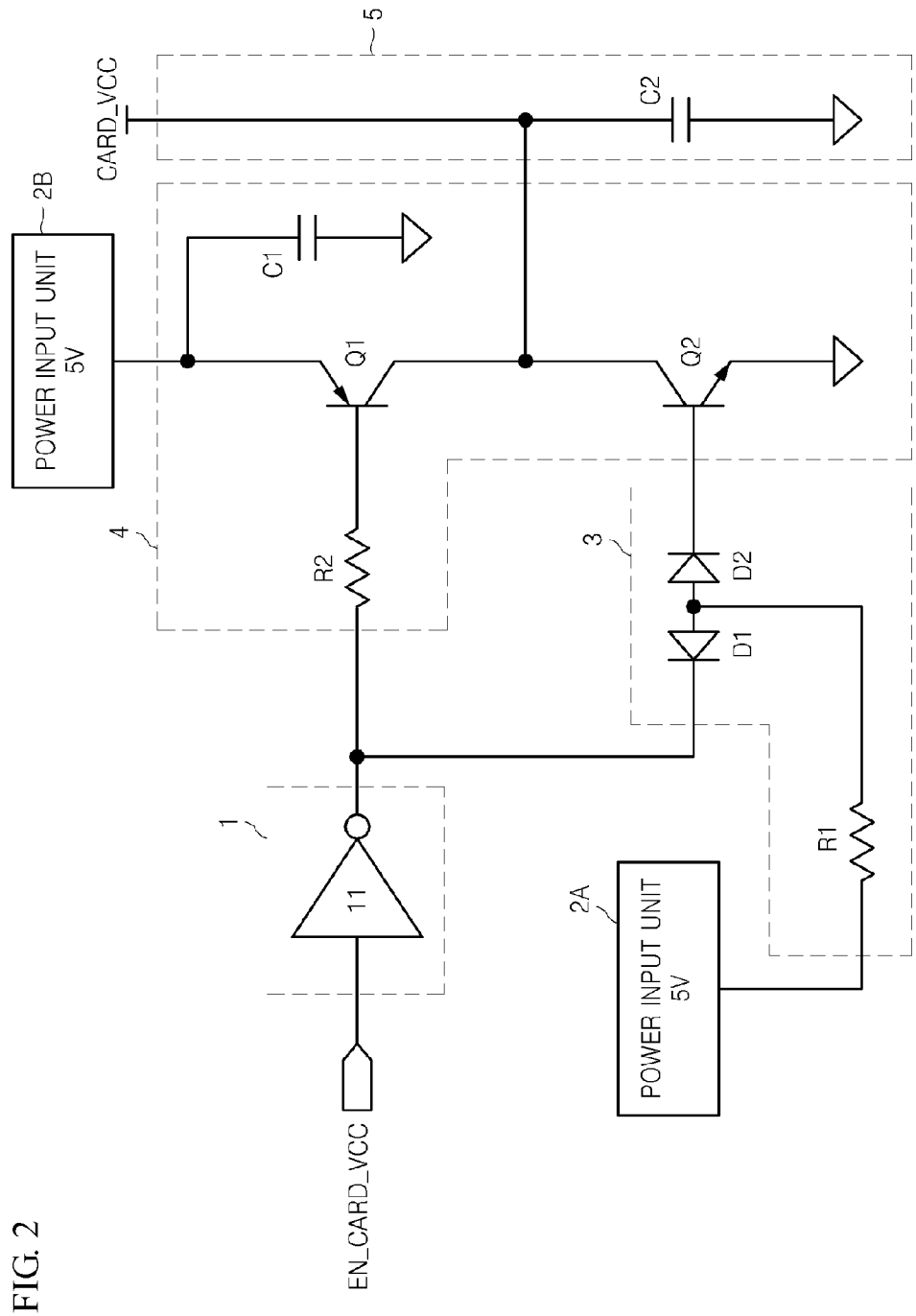
FIG. 2 is a circuit diagram of the power interface circuit of the contact IC card reader according to the exemplary embodiment of the present invention.

Operation of the respective units of FIG. 1 will be described in further detail below with reference to a circuit diagram of FIG. 2.

A power input unit 2A receives a power supply terminal voltage (5 V) of a predetermined level from the outside and supplies the power supply terminal voltage to a common anode connection point of the switching diode unit 3, and a power input unit 2B also receives the power supply terminal voltage (5 V) from the outside and supplies the power supply terminal voltage to an emitter of a PNP transistor Q1 in the complementary transistor unit 4.

In this situation, when a power supply terminal of a contact IC card (not shown) comes in contact with the card power supply terminal CARD_VCC of the power output unit 5, a controller of the IC card reader recognizes the contact and outputs the power control signal EN_CARD_VCC in a high state.

Then, the power control unit 1 inverts the power control signal EN_CARD_VCC in the high state to a signal in a low state using an inverter I1.

Thus, the signal in the low state output from the inverter I1 of the power control unit 1 is transferred to a base of the transistor Q1 of the complementary transistor unit 4, and the transistor Q1 is turned on.

At this time, since an output terminal of the inverter I1 of the power control unit 1 is in the low state, the power supply terminal voltage (5 V) supplied through the power input unit 2A is supplied to the output terminal of the inverter I1 through a diode D1 of the switching diode unit 3. Then, a base of an NPN transistor Q2 in the complementary transistor unit 4 is put in a low state and the transistor Q2 is turned off.

Therefore, the power supply terminal voltage (5 V) input through the power input unit 2B is charged in a condenser C2 of the power output unit 5 through the transistor Q1, and the charged voltage is output to the card power supply terminal CARD_VCC. Then, the power supply terminal voltage (5 V) is transferred to the contact IC card through the card power supply terminal CARD_VCC and the power supply terminal of the contact IC card.

In this way, the IC card is activated and can communicate with the controller of the IC card reader. Thus, the controller of the IC card reader can read or write data from or to the IC card.

When the communication between the controller of the IC card reader and the IC card is finished, the controller of the IC card reader outputs the power control signal EN_CARD_VCC in a low state. Then, the power control signal EN_CARD_VCC in the low state is inverted to a signal in a high state by the inverter I1.

The signal in the high state output from the inverter I1 of the power control unit 1 is transferred to the base of the transistor Q1 of the complementary transistor unit 4, and the transistor Q1 is turned off. Thus, the power supply terminal voltage (5 V) input through the power input unit 2B is cut off by the transistor Q1.

At this time, the output terminal of the inverter I1 of the power control unit 1 is in a high state. Thus, the power supply terminal voltage (5 V) input through the power input unit 2A is supplied to the base of the transistor Q2 in the complementary transistor unit 4 through a diode D2 of the switching diode unit 3, and the transistor Q2 is turned on.

Therefore, residual voltage of the condenser C2 and the card power supply terminal CARD_VCC in the power output unit 5 is rapidly muted to a ground terminal through the transistor Q2. For this reason, a voltage level of the card power supply terminal CARD_VCC is stably maintained at a zero level.

Then, the IC card is put in an inactive state and cannot communicate with the controller of the IC card reader. Thus, the controller of the IC card reader cannot read or write data from or to the IC card.

The power input units 2A and 2B are indicated by different symbols for convenience, but are substantially implemented by one power input unit 2 as shown in FIG. 1.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The invention claimed is:

1. A power interface circuit of a contact integrated circuit (IC) card reader, comprising:
    a power control unit configured to invert, amplify and output a power control signal supplied from the outside;
    a switching diode unit configured to output a control signal for controlling on and off operations of a ground terminal transistor in a complementary transistor unit in response to the output power control signal output from the power control unit;
    the complementary transistor unit in which complementary transistors transfer a power supply terminal voltage to a power output unit or mute a card power supply terminal of the power output unit to a ground voltage level while operating inversely to each other in response to the output power control signal directly input from the power control unit and the control signal input through the switching diode unit; and
    the power output unit configured to output a voltage input through the complementary transistor unit to a card power supply terminal of an IC card or maintain the card power supply terminal at the ground voltage level in response to operation of the complementary transistor unit.

2. The power interface circuit of claim 1, wherein the power control unit includes an inverter configured to invert and amplify the power control signal.

3. The power interface circuit of claim 1, wherein the switching diode unit includes:
    a first diode whose anode is connected to a power input terminal and whose cathode is connected to an output terminal of the power control unit; and a second diode whose anode is connected to the power input terminal and whose cathode is connected to a base of the ground terminal transistor in the complementary transistor unit.

4. The power interface circuit of claim 1, wherein the complementary transistor unit includes:
   a PNP transistor whose emitter is connected to a power supply terminal of a power input unit, whose base is connected to an output terminal of the power control unit, and whose collector is connected to a power input terminal of the power output unit; and
   the ground terminal transistor, which is an NPN transistor whose collector is connected to the collector of the PNP transistor, whose base is connected to output terminal of the switching diode unit, and whose emitter is connected to a ground terminal.

5. The power interface circuit of claim 1, wherein an input terminal of the power output unit is connected to the card power supply terminal of the contact IC card, and
   the connection point is connected to a ground terminal through a condenser.

6. The power interface circuit of claim 1, wherein the power control unit directly inputs the power control signal to the complementary transistor unit in response to the control signal input through the switching diode unit.

7. The power interface circuit of claim 1, wherein the power control unit directly inputs the power control signal to a complementary transistor, which is complementary to the ground terminal transistor, of the complementary transistor unit in response to the control signal input through the switching diode unit.

8. The power interface circuit of claim 1, wherein the power control signal is supplied from the outside in response to the IC card contacting a power supply terminal of the power output unit.

9. A power interface circuit of a contact integrated circuit (IC) card reader, comprising:
   a power control unit configured to invert, amplify and output a power control signal supplied from the outside;
   a switching diode unit configured to control on and off operations of a ground terminal transistor in a complementary transistor unit in response to an output signal of the power control unit;
   the complementary transistor unit in which complementary transistors transfer a power supply terminal voltage to a power output unit or mute a card power supply terminal of the power output unit to a ground voltage level while operating inversely to each other in response to a control signal input from the power control unit and a control signal input through the switching diode unit; and
   the power output unit configured to output a voltage input through the complementary transistor unit to a card power supply terminal of an IC card or maintain the card power supply terminal at the ground voltage level in response to operation of the complementary transistor unit,
   wherein the switching diode unit includes:
      a first diode whose anode is connected to a power input terminal and whose cathode is connected to an output terminal of the power control unit; and
      a second diode whose anode is connected to the power input terminal and whose cathode is connected to a base of the ground terminal transistor in the complementary transistor unit.

* * * * *